Patented Oct. 4, 1938

2,131,894

UNITED STATES PATENT OFFICE 2,131,894

AZO DYESTUFFS AND THEIR PRODUCTION

Arthur Howard Knight, Blackley, Manchester, England, assignor to Imperial Chemical Industries Limited, a corporation of Great Britain No Drawing. Application November 30, 1934, Serial No. 755,505. In Great Britain December 8, 1933

12 Claims. (Cl. 260—205)

In U. S. Patent No. 1,483,084 there is described the manufacture of azo dyestuffs which dye wool and silk from an acid bath and which owe their solubility and acid character to the presence in their structure of the alcoholic sulphuric acid group —$C_2H_4SO_4H$ attached to nitrogen. Dyes containing this —$C_2H_4SO_4H$ group (including soluble salts thereof) have been called "sulphato" dyes.

In British specification No. 237,739 there is described a process of dyeing acetate artificial silk by applying certain sulphato monoazo dyes, and in particular the sulphato compounds of nitrated monoazo dyes, in a neutral, acid, or alkaline dye-bath.

According to the present invention I apply new sulfato-monoazo dyes, namely, 2,6-di-chloro-4-nitrobenzeneazo-p-N-sulphatoethyl-aniline, 2,6-di-bromo-4-nitrobenzeneazo-p-N-sulphatoethyl-aniline, 2-chlor-6-brom-4-nitrobenzeneazo-p-N-sulphatoethyl-aniline, 2,6-di-chloro-4-nitrobenzeneazo-p-N-sulphatopropyl-aniline, 2,6-di-bromo-4-nitrobenzeneazo-p-N-sulphatopropyl-aniline, 2-chlor-6-brom-4-nitrobenzeneazo-p-N-sulphatopropyl-aniline, 2,6-di-chloro-4-nitrobenzeneazo-p-N-alkyl-N-sulphatoethyl-aniline, 2,6-di-bromo-4-nitrobenzeneazo-p-N-alkyl-N-sulphatoethyl-aniline, 2-chlor-6-brom-4-nitrobenzeneazo-p-N-alkyl-N-sulphatoethyl-aniline, 2,6-di-chloro-4-nitrobenzeneazo-p-N-alkyl-N-sulphatopropyl-aniline, 2,6-di-bromo-4-nitrobenzeneazo-p-N-alkyl-N-sulphatopropyl-aniline, 2-chlor-6-brom-4-nitrobenzeneazo-p-N-alkyl-N-sulphatopropyl-aniline, in the coloring of acetate artificial silk, silk, tin-weighted silk, leather, and wool.

Also according to the invention I manufacture new mono-azo dyestuffs by coupling diazotized 2,6-dichloro-4-nitro-aniline or 2,6-dibromo-4-nitroaniline or 2-chloro-6-bromo-4-nitroaniline with an N-sulphatoethyl (or propyl), or an N-alkyl-N-sulphato-ethyl (or propyl) derivative of an amine of the benzene series adapted to couple in the para position to the amino group.

Also according to the invention I manufacture the new dyestuffs by treating the dry water insoluble dyestuffs obtained by combining diazotized 2,6-dichloro- or 2,6-dibromo- or 2-chloro-6-bromo-4-nitroaniline with an N - β - hydroxy-ethyl- or hydroxy-propyl- or an N-alkyl-N-β-hydroxyethyl- or hydroxy-propyl derivative of an amine of the benzene series adapted to couple in the para position to the amino group with an agent adapted to give the sulphuric esters.

The new dyestuffs have very good affinity for acetate artificial silk, dyeing that material from an acid, neutral or alkaline bath in orange-brown to red-brown shades of good fastness properties and good dischargeability. They are also eminently suitable for the direct printing of acetate artificial silk. Moreover they are valuable for dyeing wool, natural silk, and tin-weighted silk and leather in orange-brown to red-brown shades.

The invention is illustrated but not limited by the following examples in which the parts are by weight.

Example 1

Sixty-nine (69) parts of sodium nitrite are added to 1480 parts of 100% sulphuric acid and stirred until no solid remains, then 277.7 parts of 2,6-dichloro-4-nitroaniline (10% excess of theory) are added to this with stirring during two hours and stirring continued for a short time longer if necessary, until no solid matter remains. The resulting liquid is then poured into 4000 parts of ice and 1000 parts of water with good agitation. After stirring for half an hour the solution of the diazotized 2,6-dichloro-4-nitroaniline is filtered from undiazotized base and added slowly to a cooled solution of 245 parts of N-ethyl-N-sulphatoethylaniline in 4000 parts of water containing 40 parts of caustic soda. Ice is added from time to time to keep the temperature of the coupling medium at 0°–5° C. and 40% aqueous caustic soda is also added gradually at such a rate that the coupling medium is at no time during coupling more than slightly acid to Congo Red paper or slightly alkaline to Clayton Yellow paper. When coupling is complete the dyestuff suspension is made alkaline by the addition of caustic soda and the dyestuff is then filtered off, washed with 5% brine and preserved as paste or dried in any suitable way. It is soluble in water and dyes acetate artificial silk from a neutral bath containing 3% salt, giving orange-brown shades of good fastness properties and good dischargeability.

It can also be employed for the production of orange-brown prints on acetate artificial silk.

The dyestuff when applied from an acid bath, possesses good affinity for wool, natural silk, and tin-weighted silk, dyeing these materials in orange-brown shades.

When applied to leather by the method usually employed for acid dyestuffs it produces orange brown shades of good fastness properties.

If instead of using 227.7 parts of 2,6-dichloro-4-nitro-aniline there are used 325.6 parts of 2,6-dibromo-4-nitroaniline or 277.7 parts of 2- chloro-6-bromo-4-nitroaniline, dyestuffs producing similar orange brown shades are obtained. Slightly yellower shades are obtained by the dyestuffs made by using 247 parts of N-methyl-N-sulphatopropyl aniline in place of 259 parts of N-ethyl-N-sulphatopropylaniline.

N-ethyl-N-sulphatopropyl aniline is obtained in the form of an aqueous solution of its sodium salt by reacting one molecular proportion of N-ethyl-N-γ-hydroxypropyl aniline with one molecular proportion of chlorosulphonic acid in ethylene dichloride solution, adding dilute aqueous caustic soda until permanent alkalinity to Brilliant Yellow paper is obtained, and separating the aqueous extract from the ethylene dichloride.

*Example 2*

Sixty-nine (69) parts of sodium nitrite are added to 1480 parts of 100% sulphuric acid and stirred until no solid remains, then 227.7 parts of 2,6-dichloro-4-nitroaniline (10% excess of theory) are added to this with stirring during two hours and stirring continued for a short time longer if necessary, until no solid matter remains. The resulting liquid is then poured into 4000 parts of ice and 1000 parts of water with good agitation. After stirring for half an hour the solution of the diazotized 2,6-dichloro-4-nitroaniline is filtered from undiazotized base and added slowly to a cooled solution of 261 parts of N - sulphatoethyl - m - amino - p - cresol methyl ether in 4000 parts of water containing 40 parts of caustic soda. Ice is added from time to time to keep the temperature of the coupling medium at 0°–5° C. and 40% aqueous caustic soda solution is added at such a rate that the coupling medium is kept only just acid to Congo Red paper during the addition of the diazo solution. When all the diazo solution has been added the dyestuff is filtered from the acid medium, washed with water, and the dyestuff paste ground with sufficient sodium carbonate to neutralize any remaining free acidity and to convert the dyestuff into its sodium salt. The dyestuff can then be preserved as paste or dried in any suitable way.

It dyes acetate artificial silk from a neutral bath containing 3% salt in red-brown shades of good fastness properties and dischargeability. It is also suitable for the direct printing of acetate artificial silk.

N-sulphatoethyl-m-amino-p-cresol m e t h y l ether is obtained by treating one molecular proportion of N-β-hydroxyethyl-m-amino-p-cresol methyl ether in tetrachloroethane with one molecular proportion of chlorosulphonic acid, removing the tetrachloroethane and crystallizing the crude sulphate compound from alcohol. It has m. p. 192° C.

If in place of 325.6 parts of 2,6-dibromo-4-nitroaniline, there are used 227.7 parts of 2,6-dichloro-4-nitroaniline or 277.7 parts of 2-chloro-6-bromo-4-nitroaniline, there are obtained dyestuffs producing similar red-brown shades.

*Example 3*

Sixty-nine (69) parts of sodium nitrite are added to 1480 parts of 100% sulphuric acid and stirred until no solid remains, then 325.6 parts of 2,6-dibromo-4-nitroaniline (10% excess of theory) are added to this with stirring during two hours and stirring continued for a short time longer if necessary, until no solid matter remains. The resulting liquid is then poured into 4000 parts of ice and 1000 parts of water with good agitation. After stirring for half an hour the solution of the diazotized 2,6-dibromo-4-nitroaniline is filtered from undiazotized base and added slowly to a cooled solution of 231 parts of N-methyl-N-sulphatoethylaniline in 4000 parts of water containing 40 parts of caustic soda. The temperature of the coupling medium is kept at 0°–5° C. by the periodical addition of ice, and 40% aqueous caustic soda solution is also added gradually at such a rate that the coupling medium is at no time during coupling more than just acid to Congo Red paper or slightly alkaline to Clayton Yellow paper. When coupling is complete the dyestuff suspension is rendered alkaline with caustic soda, the dyestuff filtered off, washed with 5% brine and preserved as paste or dried in any suitable way. It is soluble in water and dyes acetate artificial silk from a neutral bath containing 3% salt, giving orange-brown shades of good fastness properties and good dischargeability. The dyestuff can also be applied for the direct printing of acetate artificial silk.

The dyestuff, when applied from an acid bath, possesses good affinity for wool, natural silk and tin-weighted silk, dyeing these materials in orange-brown shades.

*Example 4*

The insoluble dyestuff obtained by diazotizing 251.5 parts of 2-chloro-6-bromo-4-nitroaniline and combining the diazo solution so obtained with 207 parts of N-n-butyl-N-β-hydroxyethyl-m-toluidine is dried and ground to a powder and the powder so obtained is added during about two hours to a solution of 1480 parts of 100% sulphuric acid with good stirring. Stirring is continued for a further 12–18 hours and the sulphuric acid solution then poured into 4000 parts of ice and 1000 parts of water. The sulphate compound of the dyestuff separates from solution and is filtered off, washed thoroughly with water, and the dyestuff paste so obtained treated with sufficient sodium carbonate to neutralize any remaining sulphuric acid and to form the sodium salt of the sulphato dyestuff. The product so obtained is then preserved as paste or dried in any suitable way. It dyes acetate artificial silk in brown shades when applied from a neutral bath containing 3% salt.

N-n-butyl-N-β-hydroxyethyl-m-toluidine is obtained by treating N-hydroxyethyl-m-toluidine with n-butyl chloride. It has b. p. 177°–178° C./12 mm.

I claim:

1. The compound represented by the formula:

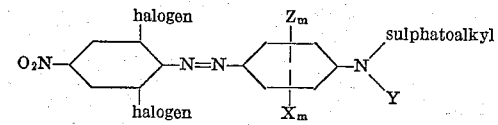

in which X is methyl, Z is methoxy, each $m$ is one of the group consisting of 0, 1, and 2, the sum of $m+m$ is not greater than 2, and Y is one of the group consisting of hydrogen and alkyl.

2. An azo dyestuff represented by the formula of claim 1 wherein the halogen is of atomic weight exceeding 30 but less than 90.

3. The compound represented by the formula:

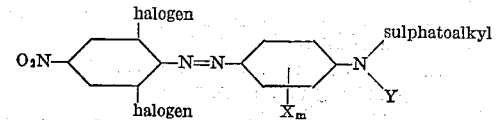

in which X is one of the group consisting of methyl and methoxy, m is one of the group consisting of 0, 1, and 2, and Y is one of the group consisting of hydrogen and alkyl.

4. The compound represented by the formula:

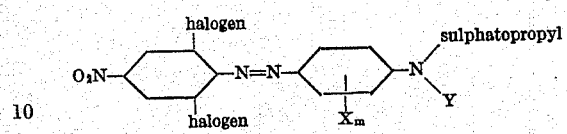

in which X, m, and Y have the meaning set forth in claim 3 and in which halogen is of atomic weight between 30 and 90.

5. An azo dyestuff having the formula:

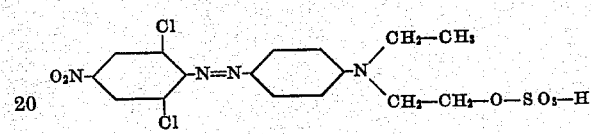

6. An azo dyestuff having the formula:

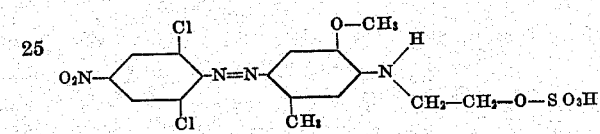

7. An azo dyestuff having the formula:

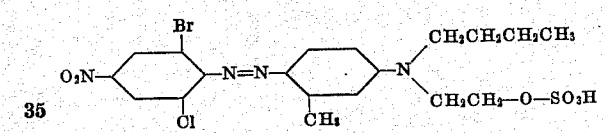

8. A process for the manufacture of azo dyes, which comprises coupling diazotized 2,6-dihalogeno-4-nitroaniline with an N-sulphatoalkyl derivative of an arylamine of the benzene series carrying at least one of the substituent group consisting of methyl and methoxy and capable of coupling para to the amino group.

9. The process which comprises in one step sulphating the N-hydroxyalkyl group of an N-hydroxyalkyl-arylamine and in another step coupling a diazotized arylamine of the formula:

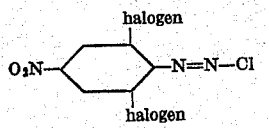

to a compound of the formula

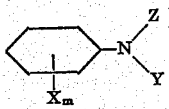

in which Y is one of a group consisting of hydrogen and alkyl, Z is one of a group consisting of hydroxyalkyl and sulphatoalkyl, X is one of a group consisting of methyl and methoxy, and m is one of a group consisting of 0, 1, and 2, whereby to form a compound represented by the formula:

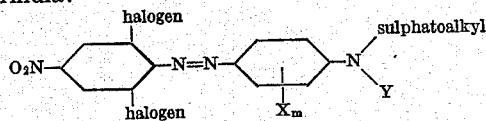

in which X is one of the group consisting of methyl and methoxy, m is one of the group consisting of 0, 1, and 2, and Y is one of the group consisting of hydrogen and alkyl.

10. Process according to claim 9 in which the N-sulphatoalkyl-N-Y derivative is an N-sulphatoethyl derivative.

11. Process according to claim 9 in which the N-sulphatoalkyl-N-Y derivative is an N-sulphatopropyl derivative.

12. The process for the manufacture of azo dyes which comprises coupling diazotized 2,6-dihalogeno-4-nitroaniline with an N-hydroxypropyl-N-X derivative of a para-coupling arylamine of the benzene series, in which X is one of the group of compounds consisting of halogen and a short chain saturated alkyl group, and subsequently converting the hydroxypropyl into sulphatopropyl by treatment with sulphuric acid.

ARTHUR HOWARD KNIGHT.